(No Model.)
A. W. CRAM.
SPICE BOX.
No. 355,255. Patented Dec. 28, 1886.
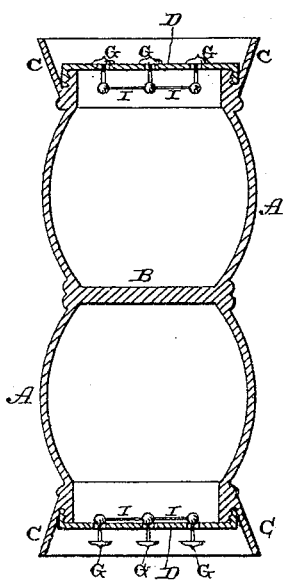
Witnesses
L. F. Gardner
A. W. Brecht
Inventor
A. W. Cram,
per J. A. Lehmann,
atty

ALONZO W. CRAM, OF HAVERHILL, MASSACHUSETTS.

SPICE-BOX.

SPECIFICATION forming part of Letters Patent No. 355,255, dated December 28, 1886.

Application filed May 24, 1886. Serial No. 203,113. (No model.)

*To all whom it may concern:*

Be it known that I, ALONZO W. CRAM, of Haverhill, in the county of Essex and State of Massachusetts, have invented certain new and useful Improvements in Combined Salt and Pepper Boxes; and I do hereby declare the following to be a full, clear, and exact description of the invention, such as will enable others skilled in the art to which it pertains to make and use it, reference being had to the accompanying drawing, which forms part of this specification.

My invention relates to an improvement in combined salt and pepper boxes; and it consists in, first, a salt or pepper box provided with a perforated cover, in combination with a series of valves, which are placed in each one of the holes of the covers, and which both serve to keep the salt or pepper agitated while the box is being shaken and to close the openings when the box is not in use; second, a combined salt and pepper box which is provided with a flange at each of its ends, and which projects beyond the cover, so as to form a base upon which the box is to rest, no matter which end is up; third, the combination, in a salt or pepper box having a perforated cover, of a series of valves which are passed through the holes or openings in the cover, and which are united together at their inner ends in any suitable manner, so as to cause them to thoroughly loosen the salt or pepper while the box is being shaken.

The object of my invention is to provide a combined salt and pepper box with a series of valves, which are passed through the openings in its covers for the purpose of keeping the salt or pepper thoroughly stirred up while the box is being shaken, to keep the holes open, and to close the openings when the box is not in use, in order to retain the strength of the article, and to provide a combined salt and pepper box which is provided with flanges upon its ends, so that either end of the box can be turned upward.

The accompanying drawing represents a vertical section of a combined salt and pepper box embodying my invention.

A represents the body of a combined salt and pepper box, and which is provided with a partition, B, at its center. This partition serves to divide the salt and pepper compartments from each other. At each end of the body A is formed a projecting flange, C, which extends slightly beyond the cover D, so as to form a base to support the box, no matter which end is turned upward. A flange is formed upon each end, so that either end of the box may be turned either up or down, as may be most convenient. The covers of each of the compartments are provided with perforations in the usual manner, and through each perforation is passed a valve, G, both ends of which are enlarged sufficiently to form stoppers for the holes through which they are passed. These valves may be connected together at their lower ends by a cord, wire, or chain, I, so as to more thoroughly separate and divide the salt and pepper while the box is being shaken; but it is not necessary to connect them together. The stems of these valves are considerably smaller than the holes through which they pass, so as to offer as little obstruction as possible to the passage of the salt or pepper. These valves are enlarged at each of their ends, so as to form stoppers for the holes, no matter which end of the box is turned upward. When the box is set upon end, those valves through the top cover sink downward, so as to close the openings against the passage of moisture from the atmosphere, while those valves in the lower cover sink down and close the openings, so as to prevent any of the salt or pepper from falling out.

By the construction here shown a combined salt and pepper box is produced which is adapted to have either compartment turned upward, as may be most convenient. Upon the covers may be marked in any suitable manner the contents of that compartment, and thus mistakes need never be made.

It is not necessary that the valves should be connected at their lower ends, for they may be made entirely separate and independent of each other; but one of the valves should be placed in every one of the holes in the covers of the box, so when that end of the box happens to be turned downward none of its contents will be spilled out. These valves are adapted to be used in salt and pepper boxes, whether the box is made double, as here shown, or not. In case the box is made single, and used for either pepper or salt alone, the valves will act in the same manner.

Having thus described my invention, I claim—

1. A combined salt and pepper box divided by a partition into two chambers and having a flange formed upon each of its ends, and which flange serves as a base to support the box in position, no matter which end of the box is turned upward, substantially as shown.

2. The combination of a perforated cover for a salt and pepper box with a series of double-ended valves, which are passed through the openings of the cover, and which serve both as stoppers for the openings and to agitate the salt or pepper, substantially as described.

3. The combination of a perforated cover for a salt or pepper box with a series of valves which are passed through the openings in the said cover, and which valves are made double-ended and connected together at their inner ends, substantially as set forth.

In testimony whereof I affix my signature in presence of two witnesses.

ALONZO W. CRAM.

Witnesses:
HARRY J. COLE,
ALBERT L. BARTLETT.